US006563811B2

(12) United States Patent
Hansén et al.

(10) Patent No.: US 6,563,811 B2
(45) Date of Patent: *May 13, 2003

(54) ROUTING DECISION IN CONNECTION-ORIENTED PACKET NETWORK

(75) Inventors: Harri Hansén, Espoo (FI); Håkan Mitts, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,166

(22) Filed: Oct. 13, 1999

(65) Prior Publication Data

US 2002/0089964 A1 Jul. 11, 2002

Related U.S. Application Data

(63) Continuation of application No. PCT/FI98/00327, filed on Apr. 9, 1998.

(30) Foreign Application Priority Data

Apr. 15, 1997 (FI) .................................................. 971588

(51) Int. Cl.[7] .............................................. H04L 12/56

(52) U.S. Cl. ..................................... 370/338; 370/395.1

(58) Field of Search .............................. 370/328, 338, 370/410, 401, 395, 389, 395.1, 396, 397, 398, 399, 395.2, 395.31, 395.51, 395.61, 395.65, 333, 350; 455/433, 435

(56) References Cited

U.S. PATENT DOCUMENTS 5,325,362 A    6/1994   Aziz
5,805,078 A  * 9/1998   Sugiyama et al. .......... 370/313
5,875,400 A  * 2/1999   Madhavapeddy et al. ...................... 455/435 X
5,889,770 A  * 3/1999   Jokiaho et al. ............. 370/337
6,018,573 A  * 1/2000   Tanaka ....................... 379/211
6,160,804 A  * 12/2000  Ahmed et al. .............. 370/349

FOREIGN PATENT DOCUMENTS

EP    566893    3/1993
EP    749261    6/1996

OTHER PUBLICATIONS

PNNI Specification, version 1.0, ATM Forum document af–PNNI–0055.000, Atm Forum, 1996.

* cited by examiner

Primary Examiner—Dang Ton
(74) Attorney, Agent, or Firm—Squire, Sanders & Dempsey LLP

(57) ABSTRACT

In a connection-oriented telecommunication system, when a connection set-up message addressed to a mobile terminal or subscriber arrives at a first switch (12) that supports a mobility management of mobile terminals, the switch, upon detecting that the set-up message is addressed to a wireless terminal, makes a decision on whether a temporary address of the terminal is inquired in a normal manner of the home network or not. The decision is made substantially on the basis of the resources needed for the connection. The information the decision is based on is available to the switch (12) that supports mobility management at latest at the time when the connection set-up message arrives at the switch. The information may be included in the connection set-up message, or it may be information stored in the system or consisting of parameter information generated of selected events, for example.

21 Claims, 4 Drawing Sheets

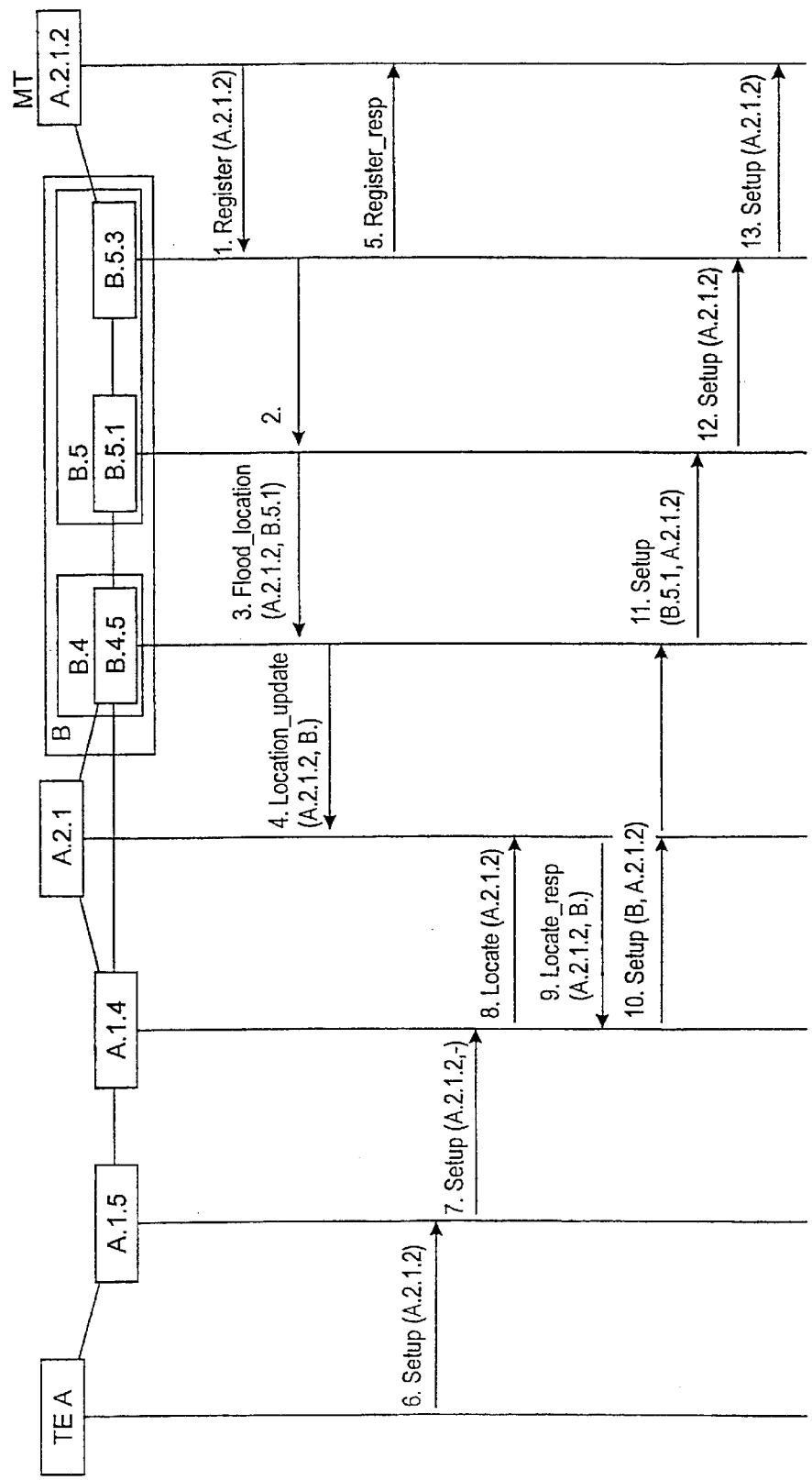

ROUTING DECISION IN CONNECTION-ORIENTED PACKET NETWORK

This is a continuation of PCT/FI/98-00327 filed Apr. 9, 1998.

FIELD OF THE INVENTION

The invention relates to telecommunication systems and particularly to a telecommunication system for implementing a connection-oriented packet network. The telecommunication system comprises at least one switch supporting the management of mobile terminals, at least one mobile terminal and at least one data base for managing mobile terminals or subscribers.

BACKGROUND OF THE INVENTION

The tendency in telecommunication industry is towards new high-quality services the implementation of which requires high bit rates. As network systems advance and grow larger, optimal management of data transmission between networks becomes increasingly important.

Among solutions attracting interest are broadband networks, the bit rates of which typically exceed 2 Mbit/s. The transfer technique selected for such B-ISDN networks (Broadband Integrated Services Digital Network) is ATM (Asynchronous Transfer Mode). ATM transmission technique is a switching and multiplexing solution, particularly associated with a data link layer (OSI Layer 2), that allows a connection-oriented network to be implemented in B-ISDN networks.

The present invention can be applied in connection with various connection-oriented packet networks to which routers (such as a TCP/IP protocol) supporting wireless terminals can be added. The invention will be illustrated using elements and terms of ATM transfer technique, without the invention being, however, restricted to them.

In ATM, an end user's data traffic is conveyed from a source to a destination through virtual connections. The data is transferred in the network through switches in fixed-length packets of 53 octets called ATM cells. FIG. 1 illustrates the structure of ATM cells. A cell comprises a header of five octets and an information field of 48 octets, which comprises the actual payload. The physical layer can comprise of a plurality of virtual paths multiplexed in an ATM layer. The paths are identified by means of a Virtual Path Identifier VPI. At a User-to-Network Interface UNI the VPI is 8 bits long and at a Network-Node-Interface NNI it is 12 bits. Each virtual path can comprise a plural number of virtual channels identified by a Virtual Channel Identifier VCI of 16 bits.

The main function of the header is to identify an interface number for a cell sequence that is transferred through a virtual channel associated with the connection. In addition to the above, the header also comprises other fields such as a Header Error Control HEC, a Generic Flow Control GFC, a Cell Loss Priority CLP and a Payload Type PT. An ATM cell indirectly comprises information about the address of the receiver, so each cell is an independent information transport unit. The number of cells transferred in a time unit is proportional to the user's bandwidth requirements.

ATM is a connection-oriented communication technique, but because a connection does not exist before it is set up, a connection set-up request must be routed from a source through the ATM network to a destination in just about the same way as packets are routed in packet-switched networks. After connection set-up, the packets travel on the same virtual channel during the connection. The ATM Forum proposes routing to be implemented by a PNNI (Private NNI) protocol, the characteristics of which are described in greater detail for instance in PNNI Specification, version 1.0, ATM Forum document af-PNNI-0055.000, ATM Forum, 1996.

The PNNI protocol functions between ATM switching systems, such as individual switches or entire networks, are connected by PNNI links. A PNNI link can be a physical link or a virtual link. A PNNI link can for instance be a virtual path combining two nodes. With respect to the PNNI protocol, the nodes are logically parallel.

The PNNI is comprised of two components: a PNNI signalling protocol and a virtual circuit routing protocol. The PNNI signalling protocol is used for transmitting ATM connection set-up messages in the network between the user-to-network interface of the source and the destination. UNI signalling is converted to NNI signalling in the destination switch. The virtual circuit routing protocol is used for routing the signalling request through the ATM network. This idea is illustrated in FIG. 2, which shows signalling used for setting up a connection between two fixed terminals FT1 and FT2.

The development of the PNNI protocol aims at two primary goals: flexible extendibility and routing based on Quality of Service. The PNNI protocol routes a connection primarily on the basis of a requested Quality of Service (QoS), traffic parameters and the resources available to the network. In connection with the connection set-up request, the desired quality of service is defined and then maintained during the entire connection. This is based on the Connection Admission Control (CAC) performed by the ATM switches, the function of which, simply put, is to ensure that as the switch receives a connection set-up request, it checks whether it can set up the connection without causing interference to existing connections. The switch approves the connection only if no interference is to be expected, otherwise the connection is routed through another switch.

In the PNNI protocol flexible extendibility is implemented by a hierarchical network organization, which involves an exchange of combined availability information between different levels of the hierarchy. FIG. 3 illustrates the PNNI hierarchy. Each PNNI hierarchy level follows the same recursive network model so that the same mechanisms are used at each hierarchy level. Each hierarchy level comprises groups called peer groups. A peer group is substantially a plurality of groups which all have access to an identical topological database and which exchange with each other link status data. For a peer group at a higher hierarchical level, each lower level peer group appears as-a logical group node exchanging, similarly as a normal node, parameters concerning the status of links and nodes with other nodes at the same level. Each peer group has a node that functions as a Peer Group Leader PGL, performing the functions of a logical group node. The status data of higher level peer groups is aggregated between the hierarchy levels, so the members of the same peer group know the status data of their own group in detail and the data concerning the higher levels with less accuracy. This knowledge depends on the distance between the hierarchy levels of the groups.

The status data of network elements in the PNNI protocol has been proposed to be transferred by Topology State Packets PTSP. The packets comprise status parameters of links and nodes denoting the communication circumstances within the network. Transfer of status data can be activated on the basis of specific events and status data in the PNNI protocol may be flooded at a desired accuracy at regular intervals within the entire network. Flooding makes updated status data available at a selected level in the entire network and members of the same peer group in particular will know the data concerning their peer group in detail.

Members of the same peer group are interconnected by horizontal links. Border nodes are peer group nodes having a link to other peer groups, also to external networks, that do not apply the PNNI protocol. Border nodes in different peer groups at the same hierarchy level determine each other as an uplink to a corresponding peer group and they also broadcast link availability data within the peer group.

An interesting recent development trend is the introduction of wireless data transmission and mobility to connection-oriented data transmission networks. This means that a network is extended over an air interface to wireless terminals. Current standards as such do not support the additional characteristics required by wireless data transmission, but various solutions for implementing mobility management for instance in connection with ATM have already been put forward. The aim is to add wireless data transmission and mobility to the ATM network.

A problem related to the mobility of terminals concerns the resources required by a location inquiry. Network routing routines should be made to function efficiently to ensure that signalling caused by routing would not excessively load the network and increase the delay in connection set-up. On the other hand, if an inquiry is not made and a connection would then have to be routed to a temporary address from the home network because the subscriber is not reached there, routing would become unreasonably inefficient, particularly when a high-rate connection or one with long duration is concerned.

To achieve an optimal location inquiry, optimizing methods based on a monitoring of connections and on statistics have been presented. A typical feature in such solutions is, however, that arriving connections are processed the same way, irrespective of the resources needed for a requested connection. In advanced networks, in which the need for resources varies greatly according to the connection concerned, this may cause a situation where the resources used for arranging the optimization exceed the benefit gained by it. Correspondingly, the optimization of a connection requiring plenty of resources should be made accurately and thus, optimal routing would still compensate for the resources used for the optimization.

BRIEF SUMMARY OF THE INVENTION

An object of the present invention is to provide a solution with which routing to a wireless terminal can be enhanced in connection with a connection set-up, to enable particularly the above described problems to be solved. The solution should be as flexible as possible so that it can be introduced with minor changes in current systems and, with a view to future networks, it should allow for expansion.

The objects of the invention are achieved with a telecommunication system comprising means for providing a connection, terminal or subscriber-specific information as a basis for an inquiry decision to said at least one switch that supports the management of mobile terminals, and said switch that supports the management of wireless terminals being arranged to make, in response to a received connection set-up message, a decision on whether a location inquiry is to be made to said data base or whether the connection setup is directly routed, without a location inquiry, to a home network of the mobile terminal or subscriber, or to another address selected on the basis of said information.

The invention also relates to a telecommunication system switch, said switch supporting the management of mobile terminals. The switch is characterized by being arranged to make a decision, on the basis of connection, terminal or subscriber-specific information arranged at the switch, on whether an inquiry is to be made as a result of a received connection set-up message to a home data base (HLR) of a called user terminal or subscriber, or whether the connection set-up is routed directly, without a location inquiry, to a home network of the mobile terminal or subscriber, or to another address selected on the basis of information arranged at the switch for making an inquiry decision.

The invention also relates to a method for optimizing routing in a transmission system comprising at least one switch that supports the management of mobile terminals, at least one mobile terminal and at least one data base (HLR) for the management of location information related to mobile terminals or subscribers. The method comprising the steps of providing the information needed for an inquiry decision to at least one switch that supports the management of mobile terminals, and making a decision, in response to a received connection set-up message, to perform, from said data base (HLR) comprising the location information, an inquiry based on the information needed for said inquiry decision.

When a connection set-up message addressed to a mobile terminal or a subscriber is provided to the network, it is routed to the home network of the destination subscriber. The invention is based on the idea that when a message arrives to a first switch supporting mobility management, the switch, detecting that the message is destined for a wireless terminal, makes a decision on whether a temporary address of the terminal or subscriber is inquired of the home network in a normal manner or not. The decision is substantially made on the basis of the resources needed for the connection. If the inquiry decision is not made directly, it can be optimized using a selected optimizing method. If it is decided that a location inquiry from the home network is not made, the. connection set-up message can be routed directly to the home network or another address selected on the basis of the information. The information the decision is based on should be available to the switch supporting mobility management, at the latest, when the connection set-up message arrives at the switch. The information may be for instance included in the connection set-up message, stored in the system, consist of parameter data generated of selected events, or it may combine all of these.

The invention offers an essential improvement in comparison with other prior art routing proposals, by providing a means for making a decision on a location inquiry and a related optimization of an inquiry decision on the basis of characteristics related to a requested connection.

BRIEF DESCRIPTION OF THE DRAWINGS

In the following the invention will be described in greater detail in connection with preferred embodiments, with reference to the attached drawings, in which

FIG. 4 is a diagram and FIGS. 5 and 6 are signalling diagrams illustrating a first preferred embodiment of a solution of the invention;

DETAILED DESCRIPTION OF THE INVENTION

The invention will now be described in an ATM-based network comprising switches supporting also the mobility management of wireless terminals, the invention being, however, not restricted to this alternative. A decision-making according to the invention is possible also in other connection-oriented packet networks, to which characteristics supporting the operation of wireless terminals can be added.

Figure 1:
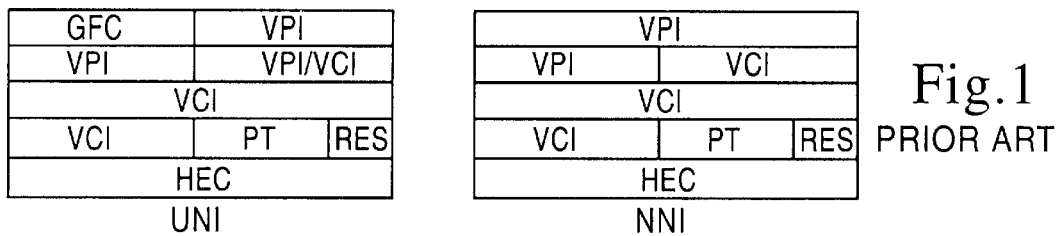
FIG. 1 illustrates a structure of ATM cells according to prior art.
Figure 2:
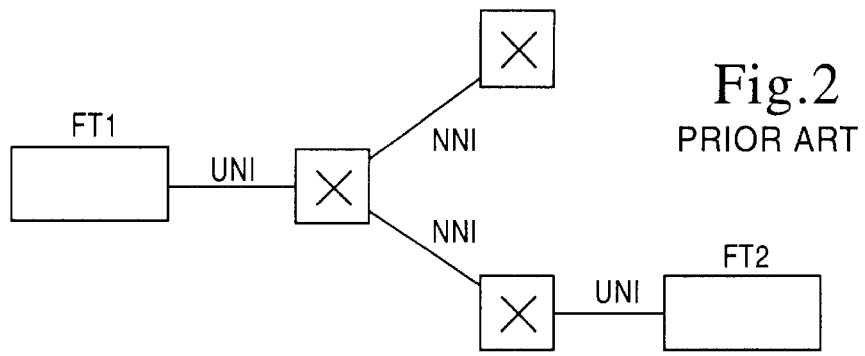
FIG. 2 illustrates nodes in a PNNI protocol according to prior art.
Figure 3:
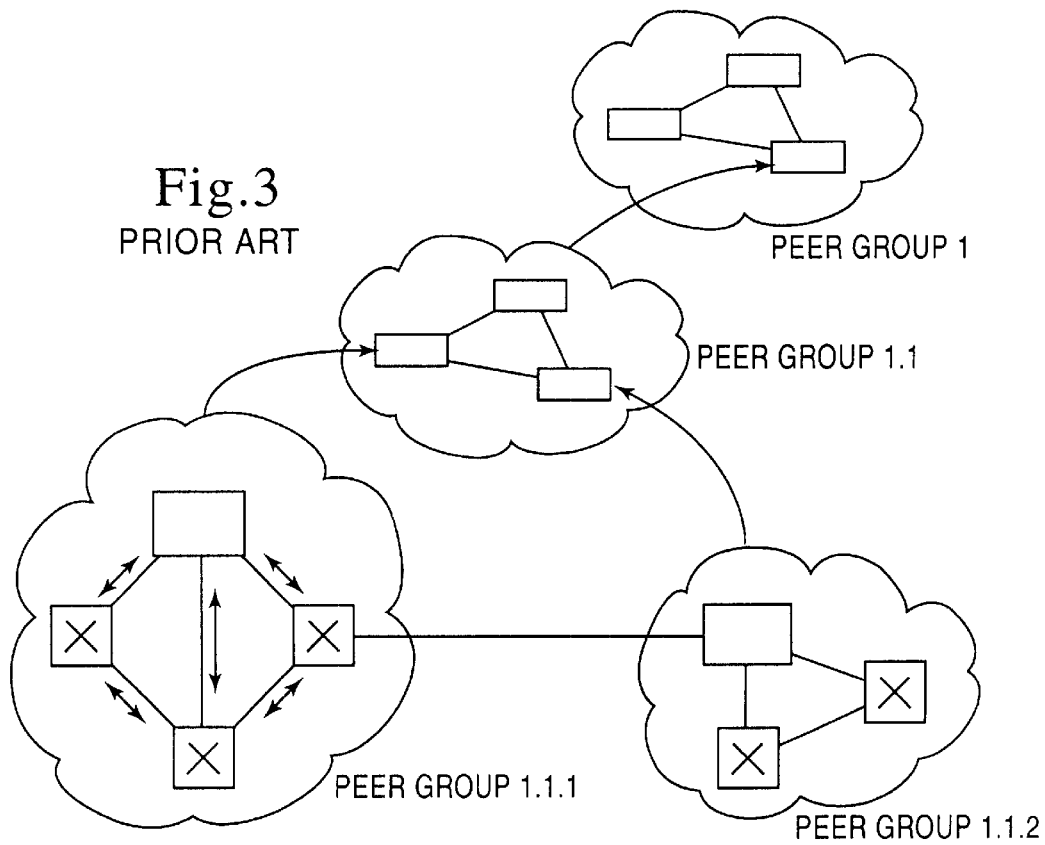
FIG. 3 illustrates a hierarchical structure of a PNNI protocol and a concept of a peer group according to prior art.
Figure 4:
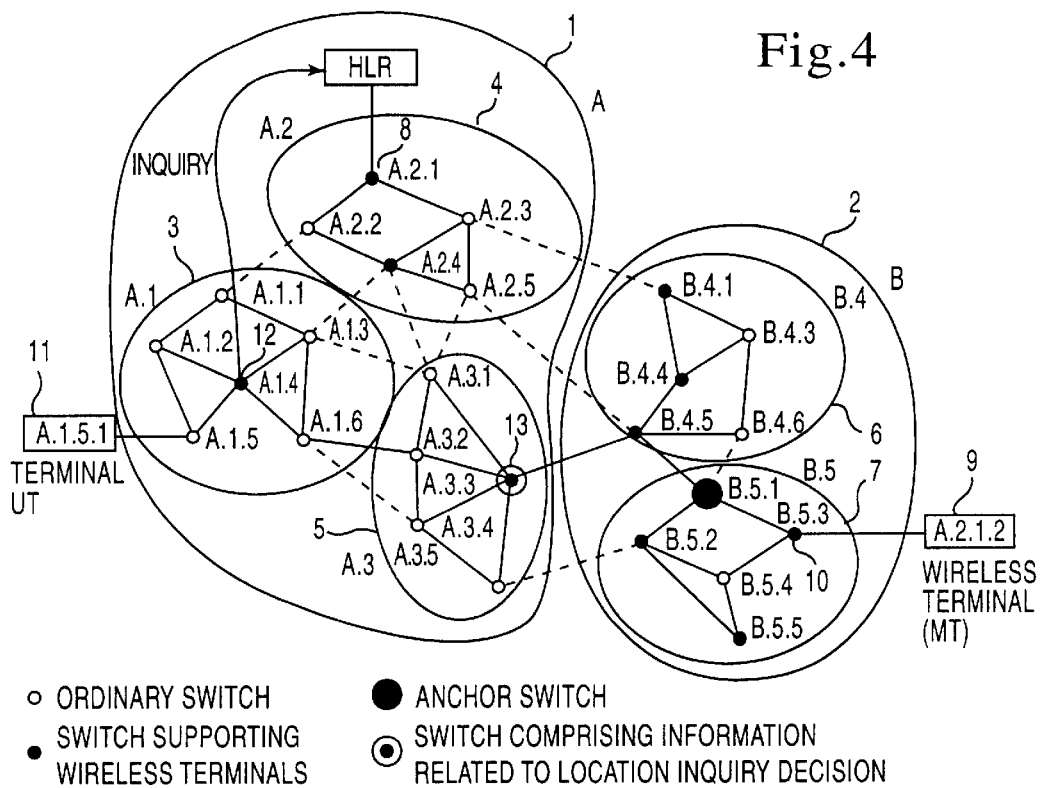
Figure 6:
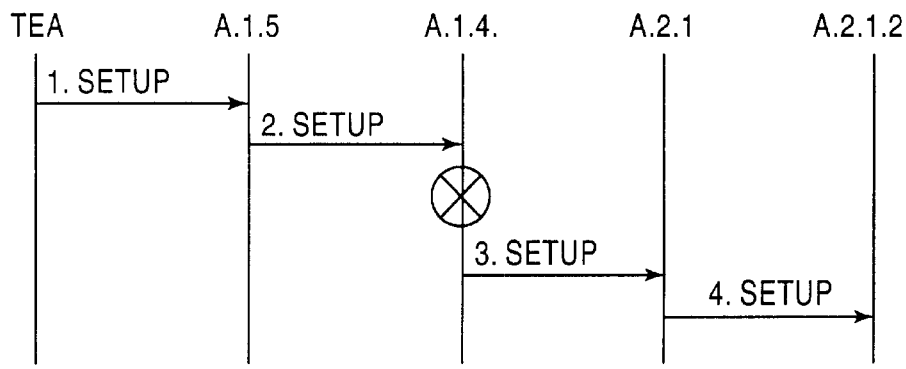

FIG. 4 shows a diagram and FIGS. 5 and 6 show signalling diagrams illustrating a preferred embodiment of a solution of the invention. In the example, an ATM switch supporting wireless terminals makes a decision on whether a location inquiry is performed in a normal manner, or whether the need for an inquiry is checked on the basis of information received about the mobility of the user terminal. In the preferred embodiment, the switches supporting wireless terminals collect information about the reachability of user terminals and on the basis of said information they make a decision on the inquiry.

FIG. 4 shows two peer groups A 1 and B 2 next to each other, divided according to a PNNI protocol into lower level peer groups, of which FIG. 4 shows peer groups A.1. to A.3., B.4. and B.5.

Let us first study signalling related to connection set-up, with reference to the diagram in FIG. 4 and the signalling diagram in FIG. 5. A mobile terminal MT 9, which is associated with a switch A.2.1; 8 of peer group A.2; 4 and the permanent address of which is A.2.1.2, registers in a switch B.5.3; 10 of peer group B.5; 7.

As illustrated in FIG. 5, registration in a visited peer group causes the generation of location signals 1 through 5 from the visited network B.5; 7 to the home peer group switch A.2.1; 8. When a terminal UT 11 of peer group A.1; 3 at the address A.1.5.1 provides a connection set-up message (signal 6) to the mobile terminal 9, the permanent address of which is A.2.1.2, the message is transmitted towards the peer group A.2; 4 (signal 7). When the connection set-up message arrives at switch A1.4; 12 supporting wireless terminals, a location inquiry is performed (signals 8 and 9). The message is routed on the basis of a location inquiry to the peer group B.5; 7 (signals 10 to 13). Location monitoring and the routing implementation taking place after the inquiry are not essential to the present invention. They are described in greater detail in application Ser. No. 09/416,091, 'Location management in a connection-oriented packet network' filed on Oct. 12, 1999 by the same applicant, so they. are not discussed in any further detail here.

Let us now proceed to FIG. 6. According to the idea of the invention, switches supporting wireless terminals, also switch A.1.4; 12, comprise information about how often a location inquiry performed in connection with a connection set-up of user terminals connected via the switches, has provided as a response, an address other than the address of the visited peer group. The information is maintained at the switches. in a form of parameters.

In FIG. 6, when the user terminal UT 11 of peer group A.1; 3 at the address A.1.5.1 (see FIG. 5) provides a connection set-up message to the mobile terminal MT 9, the permanent address of the which is A.2.1.2 (signal 1), the message is transmitted towards peer group A.2; 4. When the connection set-up message arrives at the switch A.1.4; 12 (signal 2) supporting wireless user terminals, the switch makes a decision, according to the preferred embodiment of the invention, on whether the routing is continued in a normal manner or whether an optimization of routing inquiry is attempted. If it can be concluded or predicted on the basis of the connection set-up inquiry that the connection in question is an expensive one and will use plenty of resources, the switch decides that routing is continued in a normal manner by a location inquiry. If this is not the case, the switch checks whether previous information about the accessibility of the mobile terminal MT is available in the home network A.2; 4. If such information is found, switch A.1.4; 12 uses a retrieved parameter to decide whether a location inquiry is to be performed or not.

If a parameter related to the mobile terminal MT 9 shows that the mobile terminal rarely leaves the home peer group, a location inquiry is not performed, but the connection set-up request is routed directly to home peer group 4 (signals 3 and 4) of the mobile terminal MT 9. This enhances connection set-up and reduces unnecessary signalling, which the location inquiry would cause in this case. Particularly if the distance between the peer groups is long, the above described saving in signalling is significant and easily compensates for the resources used for collecting the information needed for the inquiry decision.

In the above example the decision on whether the routing inquiry should be optimized or whether it will be continued according to the protocol is made using the traffic parameters included in the connection set-up message. The example also shows that the length of the routing path can have an impact on whether a routing inquiry is made or not. It is apparent to a person skilled in the art that in this respect, various alternative methods for implementing the invention are available. The information needed for the decision can also be other information, concerning for instance the typical duration of a user terminal's connections. If the connections are typically short, the impact of a non-optimal routing on the network load is not very significant, also when a connection requiring greater bandwidth is concerned, because the inefficiently allocated resources are rapidly brought to use after the connection is terminated. Connection set-up can in this case be speeded up and the load caused by signalling reduced by not performing a frequently repeating location inquiry. On the other hand, if the connections of the user terminal are known to be long, optimal routing becomes considerably more important and a location inquiry should be performed. Different criteria for supporting the decision-making can be formulated for each application separately.

The information the decision is based on does not necessarily need to be dynamic information included in the connection set-up message or collected by the system, it can also be information provided direct to the switches or to other network elements responsible for the managing of said information, or to a user terminal, for instance in connection with introduction into use of the terminal. The information can advantageously be changed from the network, but it is not automatically updated by the network operation. Such information could for instance be used for determining that when connections are routed to user terminals of a company unit that is rarely mobile, a location inquiry is not performed, whereas when constantly mobile units (such as marketing) are concerned, an inquiry is always made. This enables creating permanent models for decision-making supporting network control, whereby the use of network resources will be enhanced.

The network element collecting and storing the information, and the extent to which the information is available in different parts of the network are not essential to the invention. It is apparent to a person skilled in the art that one or more network elements, or even a user terminal itself, can provide various different implementations also in this respect. The desired information can be for instance managed similarly as location information relating to user terminals whereby the terminal itself collects information about its traffic (for instance about the duration of connections) and sends it to the home network. The home network combines the information into a parameter form and transmits them similarly as other traffic parameters (for instance information flooding between PNNI peer groups in an ATM network) to switches from which network terminals are contacted. What is essential to the invention is that the information is available to the switch supporting wireless terminals at the latest when the connection set-up message arrives at the switch and the switch makes a decision on whether routing is continued in a normal manner or not.

Figure 7:
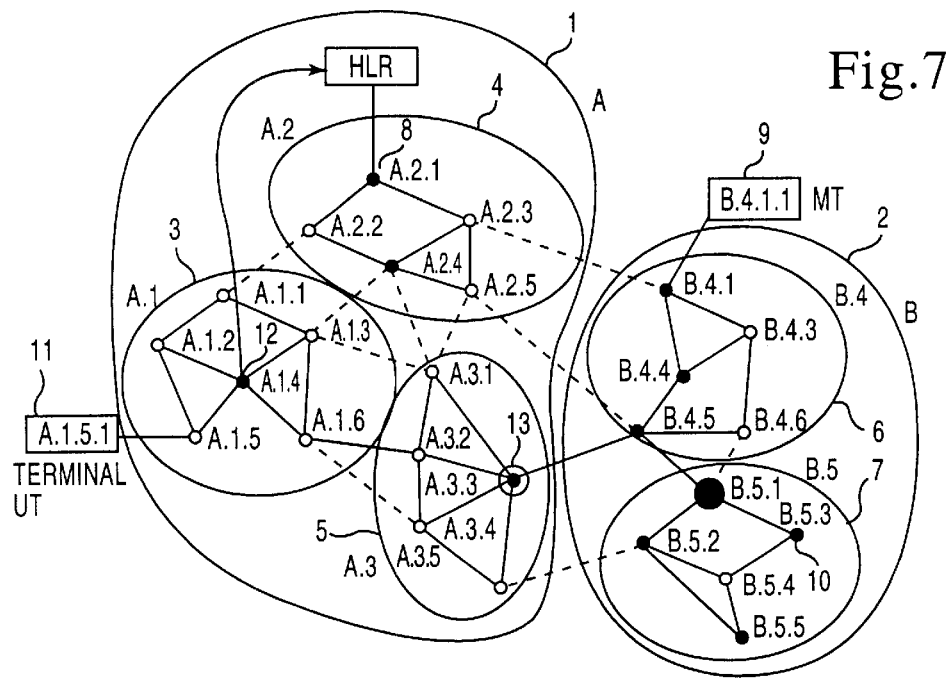
FIG. 7 illustrates a second preferred embodiment of the invention.

If, due to the type of traffic in the network, it is not advantageous to arrange the information needed for the decision to all switches that support wireless terminals, more accurate routing can also be achieved by selecting for each peer group an element that maintains information for inquiries by switches of the peer group concerned. If a routing inquiry is preferably not made directly, and yet the decision-making should be made more accurate, the switch can in such cases be determined to inquire more information of an element of the peer group concerned and to make a decision on the basis of the inquiry. This alternative is illustrated in FIG. 7. This hierarchical inquiry structure provides an efficient embodiment of the invention because it allows information to be centrally collected and maintained. In the described example, the connection set-up request is destined for a wireless terminal B.4.1.1;. 9 of peer group B.4; 6. It is characteristic of the described system that each peer group has at least one switch which stores, in addition to information about its own peer group, information related to making a location decision associated with user terminals of other peer groups. In peer group A the switch is A.3.3; 13.

When a connection set-up message, with a resource not directly exceeding the limit activating an automated location inquiry, arrives at the switch A.1.4; 12 supporting wireless terminals, the switch inquires of said peer group switch A.3.3; 13 whether an inquiry to the subscriber's home network should be made or not. If the switch A.3.3; 13 detects, on the basis of the information it has collected, that the user terminal in question is rarely mobile and uses short connection times, a location inquiry is not made, and the message is routed directly to the home address of the user terminal. In an opposite case, for instance, the terminal in question is frequently mobile, a location inquiry is performed. If the distance to the subscriber's home network is long, the advantage gained in signalling performed over long distances quickly compensates for the signalling caused by arranging the information available.

To reduce the signalling required for making the information needed for the decision available, also terminal-group-specific collection, management and transmission of information are possible. Terminals can for instance be grouped according to types, whereby it will be possible to determine, using the above alternatives described above, various models of different types and levels for making the location inquiry decision. For instance, a company's terminals can be divided into groups according to mobility and to determine that, with respect to most mobile terminals, location inquiry is always made, with respect to most stationary terminals, location inquiry is primarily not made and with respect to groups in-between, location inquiry is made if the resources needed for a requested connection exceed a selected threshold value.

Figure 8:
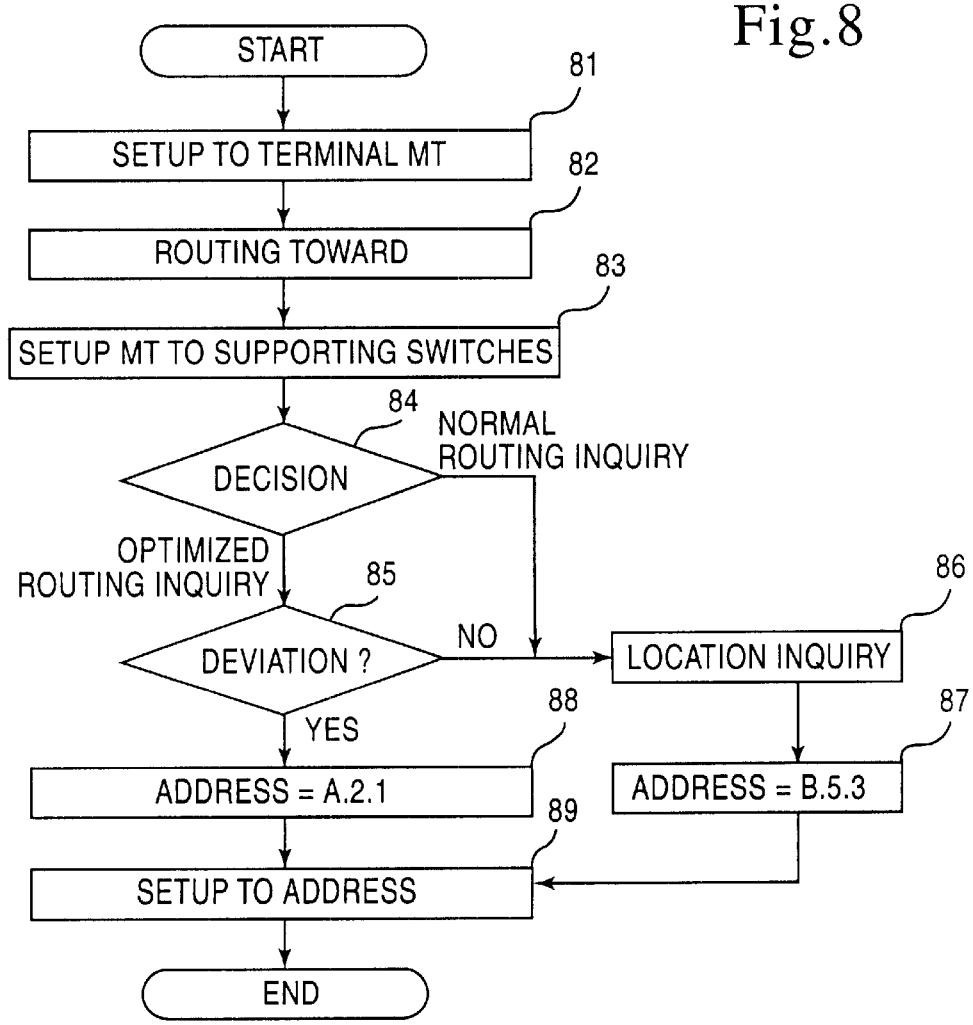
FIG. 8 is a flow diagram illustrating a method of the invention as applied in the first preferred embodiment.

FIG. 8 is a flow diagram illustrating an implementation of a method of the invention in the case of a first preferred embodiment. In step 81 the system receives a connection set-up request from a terminal. At the switches that do not support the management of wireless terminals, the message is routed towards a home peer group (step 82) of a destination terminal. When the message arrives at a switch (step 83) that supports the management of wireless terminals, the switch detects that the message is a connection set-up message addressed to a mobile terminal and the switch decides, according to the invention, whether a routing inquiry is performed in a normal manner or whether an optimization of the routing inquiry is attempted (step 84). If the switch decides that the routing should be optimized as accurately as possible, the routing is continued in a normal manner by a location inquiry (86) made to the home data base of the wireless terminal. On the basis of the location inquiry (step 86), a temporary address (step 87) of the wireless terminal is obtained and the connection set-up message is routed to the received address (step 89). If the location inquiry decision is to be optimized in step 84, the switch that supports the management of wireless terminals makes a new decision on the basis of a selected optimization principle (step 85). If, on the basis of the information it receives, the switch decides that the operation should after all continue according to the protocol, a location inquiry is performed in a normal manner (steps 86 and 87). If, on the basis of the information it receives, the switch decides that a location inquiry is not performed, it routes the connection set-up message to an address according to a selected strategy (step 88). In step 89 the connection set-up message is routed to the received address.

The above description presents some of the preferred embodiments of a solution according to the invention, but it is apparent to a person skilled in the art that the basic idea of the invention can be implemented in various different ways in different connection-oriented packet networks supporting wireless terminals. The invention and its embodiments are therefore not restricted to the above examples, but they can vary within the scope of the claims.

What is claimed is:

1. A telecommunication system for implementing a connection-oriented packet network, said telecommunication system comprising:
   at least one switch supporting the management of mobile terminals,
   at least one mobile terminal and at least one data base for managing location information concerning mobile terminals or subscribers, and
   means for providing information to be used as a basis for an inquiry decision in said at least one switch that supports the management of mobile terminals, wherein said switch that supports the management of wireless terminals is arranged to make, in response to a received connection set-up message and on the basis of said information, a decision having a first result to make a location inquiry to said data base prior to the connection setup and having a second result to directly route the connection setup without a location inquiry.

2. A system according to claim 1, wherein the information needed for the inquiry decision comprises at least information about the resources related to the requested connection.

3. A system according to claim 1, wherein the information needed for the inquiry decision further comprises at least one of the following groups:
   information about the duration of the connections of the mobile terminal or subscriber; and
   information about the mobility of a user terminal or the subscriber.

4. A system according to claim 1, wherein the information needed for the inquiry decision is constantly collected on the basis of traffic of the mobile terminal or the subscriber.

5. A system according to claim 1, wherein the information needed for the inquiry decision is stored at switches supporting the management of wireless terminals.

6. A system according to claim 1, wherein the information needed for the inquiry decision being is included in the connection set-up message.

7. A system according to claim 1, wherein the system is an ATM-based telecommunication system.

8. A method performed by a telecommunication system switch supporting the management of mobile terminals, comprising making a decision, on the basis of information arranged at the switch, the decision having a first result to make a location inquiry in consequence of a received connection set-up message to a home data base of a called user terminal or subscriber and having a second result to directly route the connection set-up without a location inquiry.

9. The method according to claim 8, wherein the information needed for the inquiry decision comprises at least information about the resources related to a requested connection.

10. The method according to claim 8, wherein the information needed for the inquiry decision further comprises at least one of the following groups:
    information about the duration of the connections of the mobile terminal or subscriber; and
    information about the mobility of the user terminal or the subscriber.

11. The method according to claim 8 further comprising constantly collecting the information needed for the inquiry decision on the basis of traffic of the mobile terminal or the subscriber.

12. The method according to claim 8 further comprising storing the information needed for the inquiry decision at said switch.

13. The method according to claim 8 further comprising including the information needed for the inquiry decision in the connection set-up message.

14. The method according to claim 8 wherein said switch is an ATM switch.

15. A method for optimizing routing in a transmission system comprising at least one switch that supports the management of mobile terminals, at least one mobile terminal and at least one data base for the management of location information related to mobile terminals or subscribers, comprising the steps of:
    providing the information needed for an inquiry decision to at least one switch that supports the management of mobile terminals; and
    making a decision, in response to a received connection set-up message and on the basis of said information, the decision having a first result to make a location inquiry to said data base comprising the location information and having a second result to omit the location inquiry.

16. A method according to claim 15, wherein the information needed for the inquiry decision comprises at least in formation about the resources related to a requested connection.

17. A method according to claim 15, wherein the information needed for the inquiry decision further comprises at least one of the following groups:
    information about the duration of the connections of the mobile terminal or subscriber; and
    information about the mobility of a user terminal or the subscriber.

18. A method according to claim 15, wherein the information needed for the inquiry decision being is constantly collected on the basis of traffic of the mobile terminal or the subscriber.

19. A method according to claim 15, wherein the information needed for the inquiry decision is stored at switches that support the management of wireless terminals.

20. A method according to claim 15, wherein the information needed for the inquiry decision is included in the connection set-up message.

21. A method according to claim 15, wherein said transmission system is an ATM-based transmission system and said switch is an ATM switch.

\* \* \* \* \*